W. HESS, Jr.
RECORDER.
APPLICATION FILED MAY 26, 1915.
1,211,703.
Patented Jan. 9, 1917.
5 SHEETS—SHEET 1.
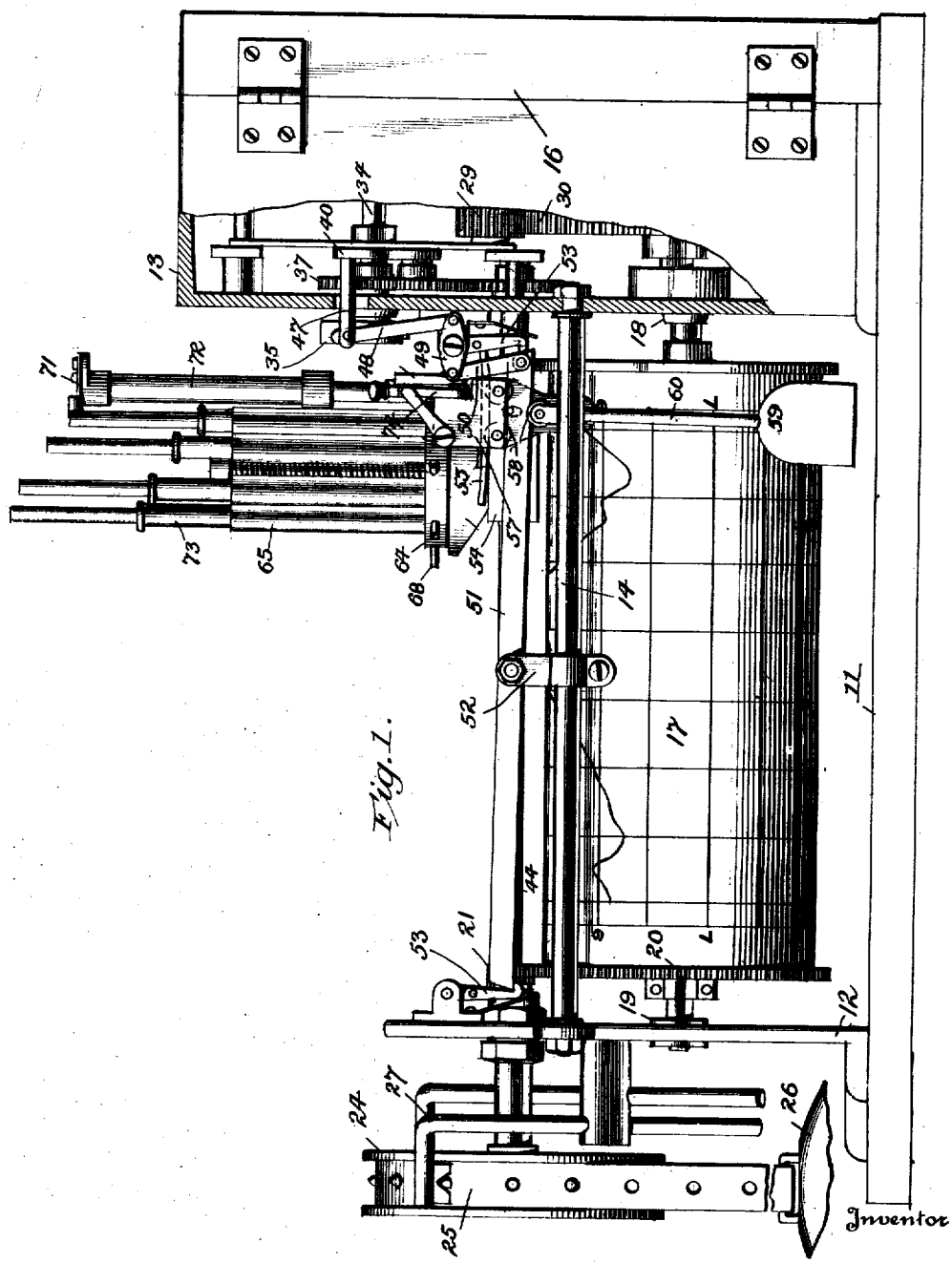

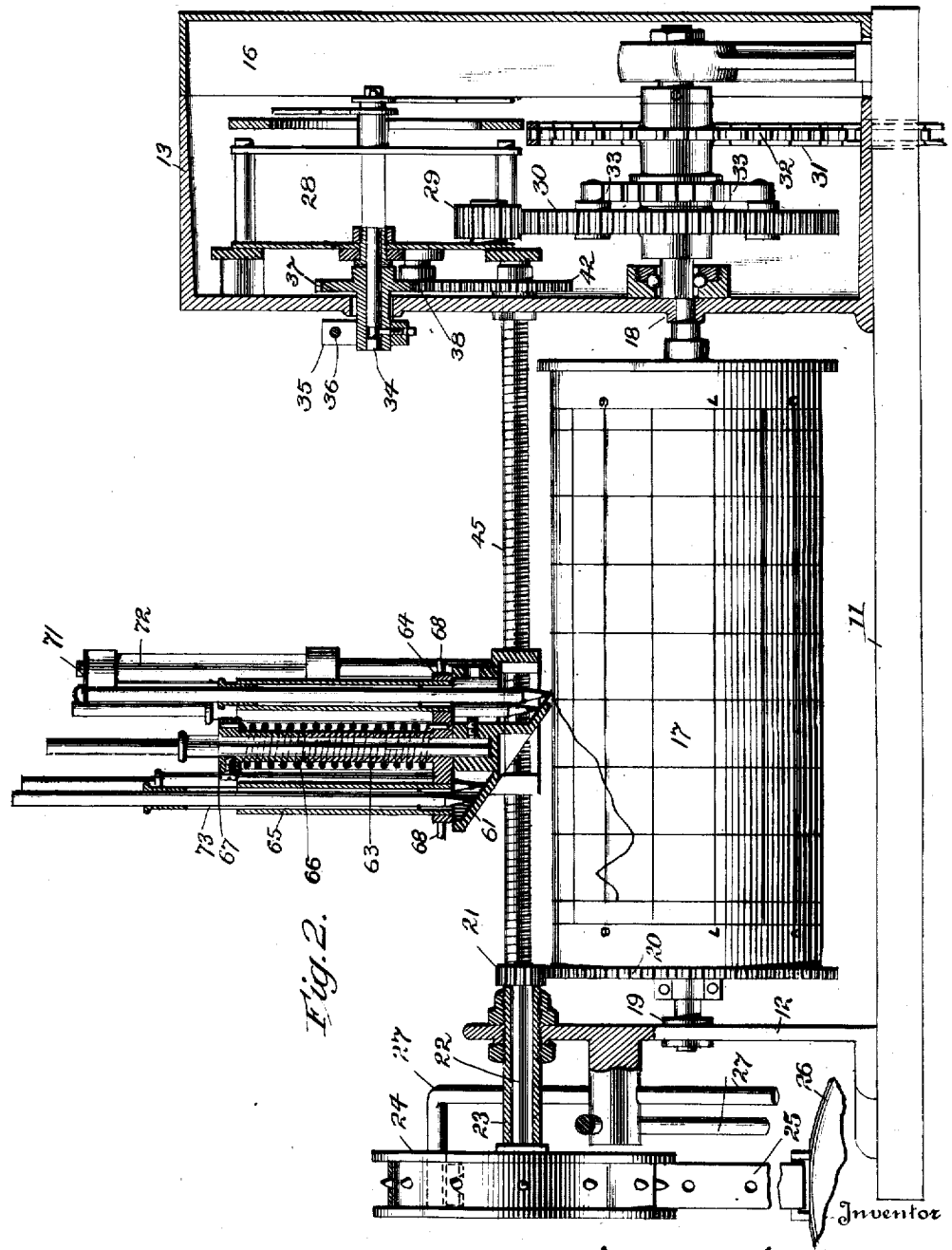

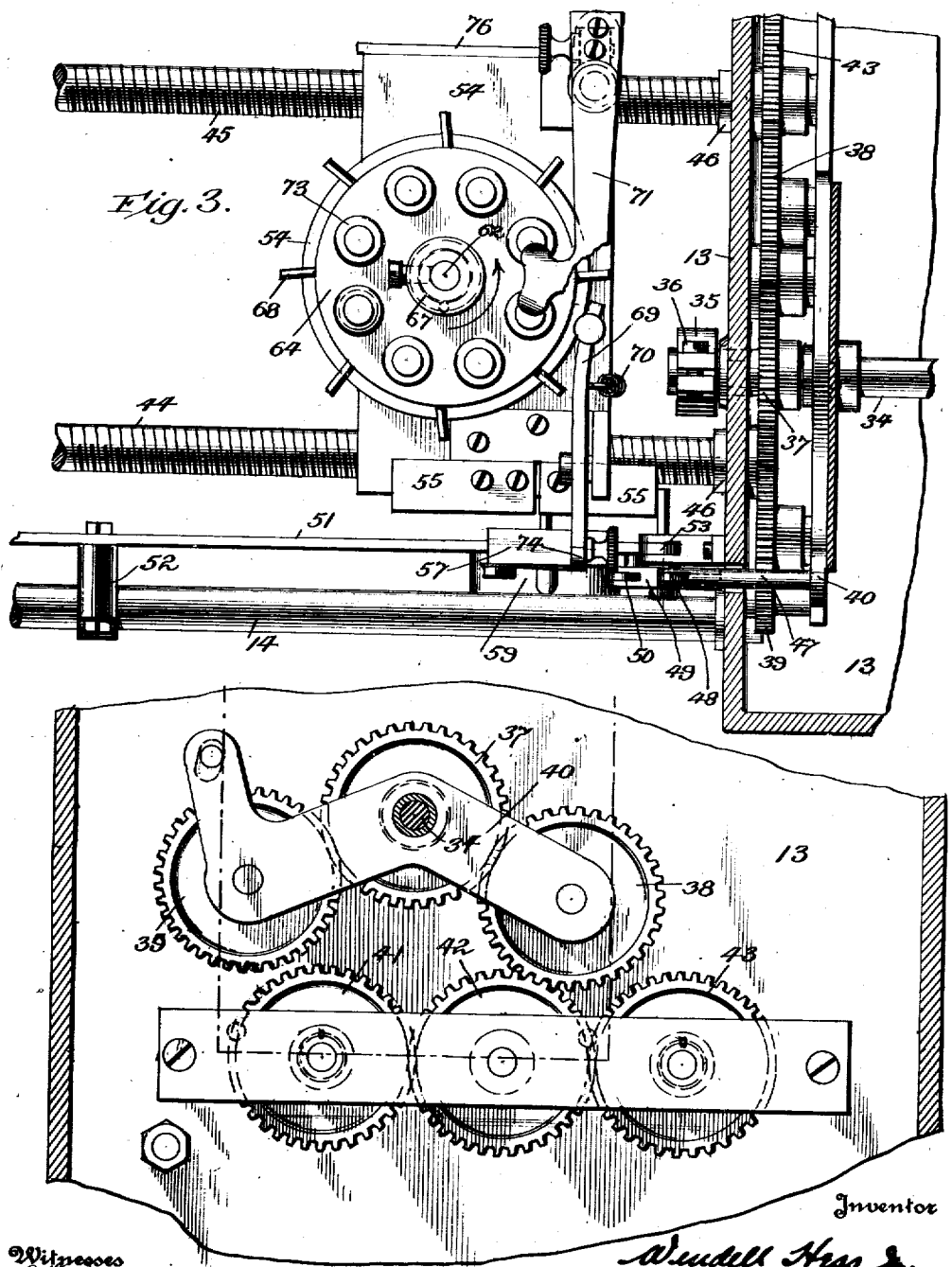

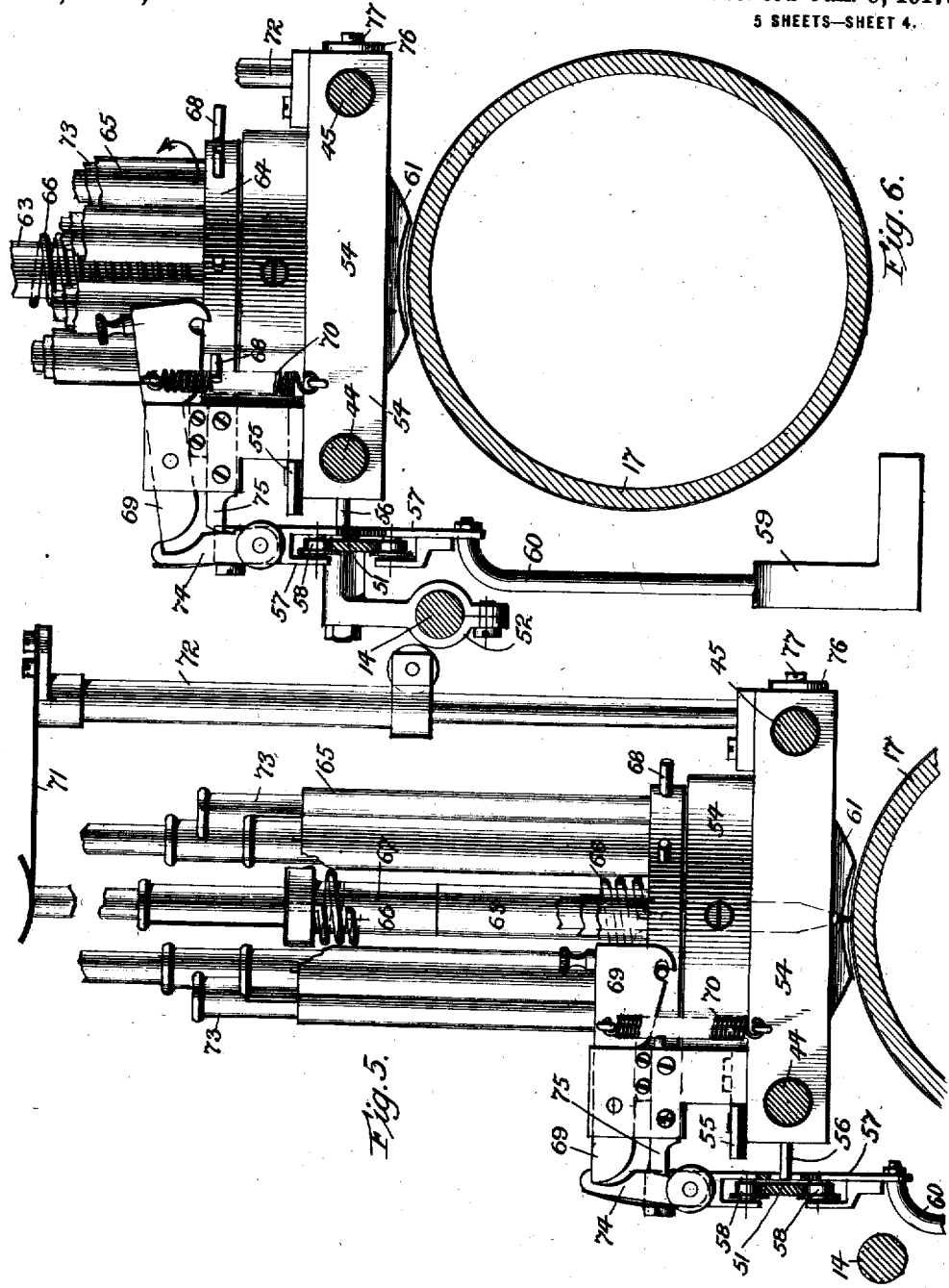

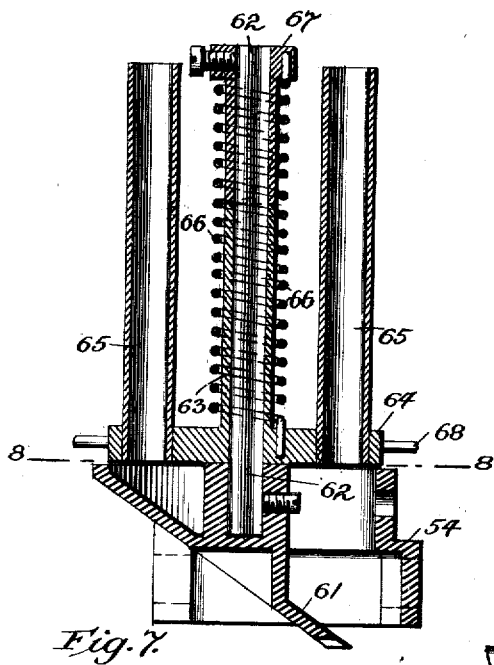
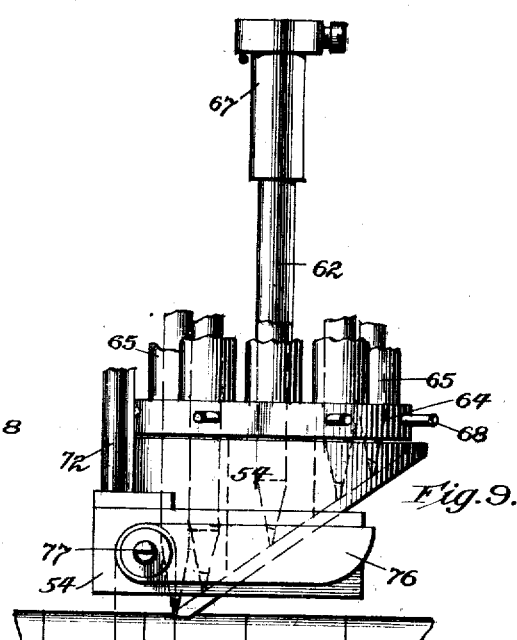
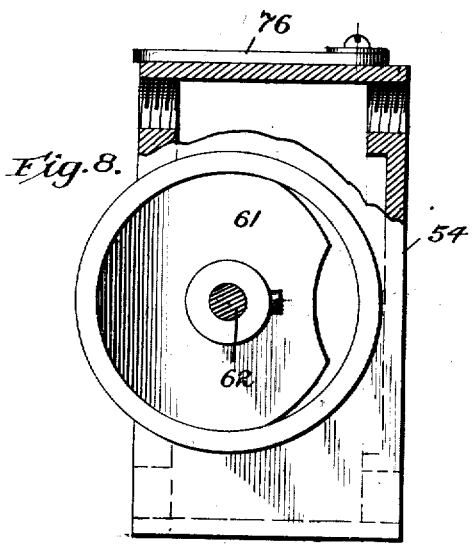
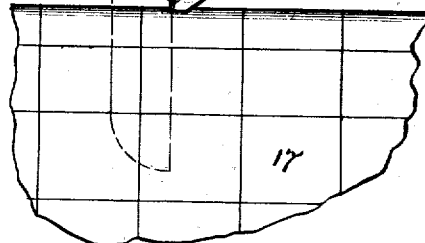
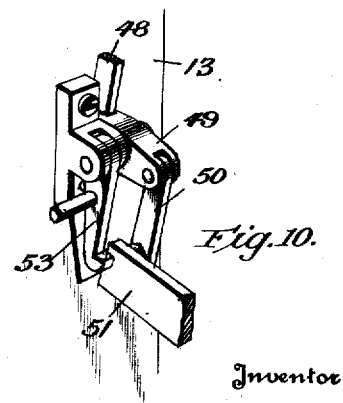

UNITED STATES PATENT OFFICE.

WENDELL HESS, JR., OF TROY, NEW YORK, ASSIGNOR TO W. & L. E. GURLEY, OF TROY, NEW YORK, A CORPORATION OF NEW YORK.

RECORDER.

1,211,703.  
Specification of Letters Patent.  
Patented Jan. 9, 1917.

Application filed May 26, 1915. Serial No. 30,542.

*To all whom it may concern:*

Be it known that I, WENDELL HESS, Jr., a citizen of the United States, residing at Troy, in the county of Rensselaer and State of New York, have invented certain new and useful Improvements in Recorders, of which the following is a specification.

This invention relates to recorders and particularly to a recorder of the continuous type capable of giving a continuous record of long duration and large scale on a record sheet of relatively small size. To accomplish this result the records for a number of successive time periods are superposed on a single sheet, the records for different time periods being distinguishable by their color. The recorder thus involves means for causing the recording mechanism to traverse the record a number of times, one for each time period, and a color change mechanism operative to change the record color at the beginning of each traverse.

I illustrate the invention as applied to a water stage recorder capable of making a record of water stages through eight successive periods of one week each.

In the drawings Figure 1 is a side elevation of the complete device, a part of the clock casing being broken away to show parts of the gearing; Fig. 2 is a view similar to Fig. 1 but showing the clock case and pencil turret in section; Fig. 3 is a plan view, partly sectional showing the turret and carriage, the clock driven lead screws, and the reversing gears for the lead screws; Fig. 4 is a fragmentary elevation showing the reversing gear - trains for the lead screws; Fig. 5 is an enlarged view of the turret showing the turret catch just ready to trip off at the moment of reversal; Fig. 6 is a somewhat similar view showing the turret catch approaching the completion of its trip off action; Fig. 7 is a vertical section of the turret; Fig. 8 is a section on the line 8—8 of Fig. 7; Fig. 9 is a fragmentary elevation showing the alining guide for the pencil points; and Fig. 10 is a perspective view of the end of the tipping track and the track catch for controlling the reversing gears and the turret catch.

The entire mechanism is mounted on a base 11 which carries a supporting frame structure consisting of a bracket 12 and a casing 13, which are tied together by a tie rod 14. The casing 13 is for inclosing the clock mechanism and certain parts of the gearing later to be described. Access to the casing is had by means of a door 16. The record drum 17 which is shown as covered by a suitable record sheet is mounted with its axis horizontal in bearings 18 and 19 in the casing 13, and the bracket 12 respectively. The drum 17 is provided with a gear 20 which meshes with a similar gear 21 on a shaft 22. This shaft 22 turns in a sleeve bearing 23 removably mounted in the bracket 12 and carries a pin sprocket 24 over which runs a perforated bronze tape 25. One end of the tape 25 is connected to a float 26 and the other to a counter-weight of usual form (not shown). The counter-weight and float coact in the usual manner to rotate the sprocket 24 in reverse directions as the float 26 rises and falls. In this way the drum 17 is caused to rotate in response to movements of the float. A pair of retaining guides 27 are mounted in a lug 15 on bracket 12, and these confine the tape 25 to the sprocket 24.

Mounted in the casing 13 is a clock movement of usual form which is generally indicated by the reference numeral 28, the working parts not being shown in detail. This movement is driven through the pinion 29 which meshes with the gear 30. The gear 30 is driven by means of a heavy weight on the chain 31 which runs over the sprocket 32. The sprocket 32 and the gear 30 are connected together by means of a pawl and ratchet mechanism 33 to permit the rewinding of the weight carried by the chain 31. This part of the mechanism is merely a clock-drive of the weight type, built somewhat more heavily than usual and provided with a weight heavy enough to furnish the necessary power through a relatively short fall, the clock being intended to run about eight weeks on one winding.

The center shaft 34 of the clock, which makes one revolution in sixty minutes, is releasably held by a split clamp 35 provided with a clamping screw 36 to a drive gear 37. The purpose of releasing the gear is to permit the setting of the recording device with reference to the clock. The gear 37 meshes with two companion gears 38 and 39 which are journaled on a yoke 40 and the yoke 40 is journaled to swing about the axis of the gear 37 so as to cause the gear 38 to mesh with a gear 42 or to cause the gear 39 to mesh with a gear 41. The gear 42 is an idle gear between gear 41 and a similar gear 43 and constrains them to rotate in a common direction. The shifting of the yoke 40 thus causes a reversal of the drive of the gears 41 and 43. The parts are so proportioned that the gears mesh properly as the yoke 40 shifts back and forth. The gears 41 and 43 are each fast to a corresponding one of two lead screws 44 and 45 which are mounted in bearings 46 in the casing 13 and in companion bearings in the frame 13.

The yoke 40 carries a pin 47 which is connected by a link 48 to one of the two arms of a bellcrank 49. The other arm of the bell crank 49 is connected by a link 50 to a rocking track 51 which is pivoted at its middle on the track 52 carried by the bar 14. This rocking track is parallel when viewed in plan, to the lead screws 44 and 45, and is capable of a limited tipping movement to either side of its horizontal position. In its extreme tipped positions it is held alternately by two spring held catches 53. The tipping of the track 51 from one limiting position to the other shifts the yoke 40 back and forth so as to reverse the direction of drive of the lead screws as will be apparent from an inspection of Fig. 1.

Mounted on the lead screws 45 and guided and driven thereby is a carriage 54 whose form is best shown in Figs. 4 to 9. This carriage carries two trip-off pins 55, which are adjustable and, which engage the catches 53 alternately to trip the same, and release the tipping track 51. Carriage 54 has a projecting pin 56 which engages a vertical slot in a secondary carriage 57 to cause the secondary carriage to move with the carriage 54, while permitting the relative upward and downward movement of said secondary carriage. This secondary carriage 57 is provided with flanged rollers 58 running on the tipping track 51. The carriage 57 carries a pendent weight 59. Thus as the carriage 54 moves along the lead screws the carriage 57 moves up the inclined track 51 and when the trip 55 forces back the corresponding catch 53 the weight 59 carried by the carriage 57 furnishes the power to shift the inclined track 51 to its reverse position. This shifting reverses the direction of rotation of the lead screws and starts the carriage 54 moving back in the reverse direction.

In addition to reversing the position of the track the descent of the secondary carriage is caused to release the color change mechanism for a limited movement at the moment of reversal so as to bring a new pencil of a different color into marking relation with the record drum as will later be described in detail.

The carriage 54 is of the form clearly shown in Fig. 7 and carries an inclined plate 61 against which the points of a number of pencils, carried by the turret, rest. The plate 61 extends downward almost into contact with the record drum, and serves to guide the pencils into and out of contact with the record drum when the turret rotates. The carriage 54 carries an upstanding fixed pin 62 and on this is journaled, by means of a sleeve 63, the turret, which comprises a base plate 64 and a number of upstanding tubular guides 65. In the present instance eight of these guides are shown. This turret is urged to rotate in a counter clockwise direction, as viewed in plan, by a coiled spring 66. This spring is coiled around the sleeve 63 and is connected at one end to a collar 67 fast on the spindle 62, and at the other end to the base plate 64. A plurality of catch pins 68 one for each guide 65 extend radially from the base plate 64, and the turret is held from rotation under the action of the spring 66 by means of a hook pawl 69 which is urged into engagement with successive pins 68 by means of a spring 70.

Each pencil is held in a clamping sleeve which consists of a split tube 73 sliding in a guide 65. These urge the pencil down by their weight and that pencil which is in marking position is further held by a spring plate 71 carried on an adjustable telescopic standard 72.

The release of the turret catch at each reversal of the carriage has already been mentioned. This is effected by a spring held catch 74 which is pivoted on the upper end of the secondary carriage 57, and which as the carriage 57 rolls up the track 51 slowly overtravels and engages the rear end of the hook pawl 69. At the end of the travel of the carriage 54, when the tilting track is released and drops, the descent of the carriage 57 pulls down the rear end of the pawl 69 through the engagement therewith of the catch 74, but the catch 74 is immediately wiped back by means of a cam or wedging lug 75 formed on a portion of the carriage 54. Thus the pawl 69 is pulled out of engagement and immediately released, so that it returns quickly enough to engage the next pin 68 to that which it releases, thus allowing the turret to rotate sufficiently to bring a new pencil into marking position, but no farther. Other suitable escapements may be used.

A gage plate 76 is pivoted at 77 on carriage 54 and is used to aline the pencils with the coördinate lines on the record sheet as indicated in Fig. 9.

The operation of the device is as follows:—The various upward and downward movements of the float cause the record drum to rotate back and forth in a corresponding manner. At the same time the clock mechanism is driving the lead screws in one direction or another so as to feed the carriage 54 in one or another corresponding direction. As the carriage moves along the lead screws the secondary carriage 57 is constrained to move with it, lifting its weight as it runs up the inclined track 51. At the end of its travel the carriage 54 trips off one of the catches 53 and the sudden descent of the carriage 57 under the action of the weight 59 reverses the inclination of the track 51 and consequently the direction of rotation of the lead screws. At the same time it momentarily releases the turret so that this may rotate the distance between two successive pencils and present a new pencil at the recording point. These pencils are of different colors and the order of their arrangement is fixed according to any accepted convention. In the machine as illustrated the carriage moves the length of the record drum in one week. Thus the records for successive weeks are made in reverse directions, and the record of each successive week is in a characteristic color. Consequently the records may be readily distinguished and interpreted even though they are superposed, and it becomes possible to make a record for eight weeks without reduction in scale on the same size record sheet as has heretofore been used for making a similar record for a single week.

In the claims I use the term "graph" or "record graph" to indicate the record line which is marked on the record sheet or blank. I use the word "pencil" as a generic term to include analogous marking means capable of ready substitution in the relation specified, and I shall use the expression "color change mechanism" in its broad sense to include any mechanism capable of giving the color change feature characteristic of this invention.

Having thus described my invention, what I claim is:—

1. In a recorder the combination of means for supporting a record sheet; marking means for tracing a graphic record on said sheet; and a color change mechanism operatively related with said marking means for changing the color of the record graph made by said marking means.

2. In a recorder the combination of means for supporting a record sheet; marking means for tracing a graphic record on said sheet; and a time controlled color change mechanism operatively related with said marking means for periodically changing the color of the record graph made by said marking means.

3. The combination with a recorder of the graphic type, of a plurality of recording pencils of different colors; and means for presenting them successively at the recording point.

4. The combination with a recorder of the graphic type of a plurality of recording pencils of different colors; and time controlled means for presenting them successively at the recording point.

5. In a recorder, the combination of means for supporting a record sheet; a carriage; driving means for propelling said carriage back and forth across said record sheet; a multiple pencil carrier provided with a plurality of pencils and shiftably mounted on said carriage; and shifting means for said carrier operating at the reversal of movement of the carriage, for causing said carrier successively to present said pencils at marking position.

6. In a recorder, the combination of means for supporting a record sheet; a carriage; means for driving said carriage back and forth across said record sheet; marking means for tracing a record graph on said record sheet by the movements of said carriage; a color change mechanism associated with said marking means for changing the color of said graph; and means for operating said color change mechanism at the reversal of motion of said carriage.

7. In a recorder, the combination of means for supporting a record sheet; a carriage; a reversible drive for propelling said carriage; a multiple pencil carrier provided with a plurality of pencils, carried by said carriage and shiftable thereon to present said pencils successively at the marking point; and an automatic actuator for simultaneously shifting said carrier and reversing said drive.

8. In a recorder, the combination of means for supporting a record sheet; a carriage; a reversible drive for propelling said carriage; marking means for tracing a record graph on said record sheet by the movements of said carriage; a color change mechanism associated with said marking means for changing the color of said graph; and an automatic actuator for simultaneously actuating said color change mechanism and reversing said drive.

9. In a recorder, the combination of means for supporting a record sheet; a carriage; a reversible drive for propelling said carriage; marking means for tracing a record graph on said record sheet by the movements of said carriage; a color change mechanism associated with said marking means for changing the color of said graph; a tipping track parallel to the path of movement of said carriage; mechanism connected with said track for reversing said drive by the alternate tipping movements of said track; a weight running on said track and connected with the carriage to be moved thereby; connections between said weight and said color change mechanism for operating the latter by the descent of the former; catches for holding said track in its alternate tipped positions; and releasing means for said catches operable by the movements of the carriage.

10. In a recorder, the combination of suitable record-sheet supporting means; a carriage; a turret movably mounted on said carriage, a plurality of marking means mounted in said turret; impelling means for said turret; an escapement for arresting said turret in a plurality of successive positions for presenting successive marking means in marking relation to the record sheet; and time controlled means for periodically actuating said escapement.

11. The combination with a recorder of the graphic type of a movable carrier provided with means for supporting a plurality of recording pencils and adapted by its movements to position the various pencils individually at the recording point; pencils carried by said carrier; and automatic actuating means for causing said carrier to position said pencils successively at the recording point.

12. The combination with a recorder of the graphic type of a movable carrier provided with means for supporting a plurality of recording pencils and adapted by its movements to position the various pencils individually at the recording point; pencils carried by said carrier; and time controlled means for causing said carrier to position said pencils successively at the recording point.

13. The combination with a recorder of the graphic type of a movable carrier provided with means for supporting a plurality of pencils; a plurality of recording pencils slidably supported in said carrier; an inclined guide engaging said pencils and serving to guide the marking ends of the same to and from the recording point as said carrier is moved; means for yieldingly urging said pencils toward the recording point; and automatic actuating means for intermittently moving said carrier to present said pencils successively at the recording point.

14. The combination with a recorder of the graphic type of a movable carrier provided with means for supporting a plurality of pencils; a plurality of recording pencils slidably supported in said carrier; an inclined guide engaging said pencils and serving to guide the marking ends of the same to and from the recording point as said carrier is moved; means for yieldingly urging said pencils toward the recording point; and time controlled means for intermittently moving said carrier to present said pencils successively at the recording point.

15. The combination with a recorder of the graphic type of a rotatable turret provided with pencil receiving guides; a plurality of recording pencils axially slidable in said guides; an inclined guide plate coacting with said pencils to guide their points in succession to and from the recording point as the turret is rotated; and automatic means for rotating said turret step by step to position said pencils successively at the recording point.

16. In a recorder the combination of suitable record-sheet supporting means; a carriage; a turret rotatably mounted on said carriage and provided with a plurality of pencil receiving guides; a plurality of recording pencils mounted in said turret to slide axially therein; an inclined plate guide coacting with said pencils to guide their points one at a time into marking contact with said sheet; a spring for rotating said turret; an escapement for arresting said turret in successive positions in which it presents successive pencils in contact with the record sheet; a reversible feed for said carriage; and means for simultaneously reversing said feed and actuating said escapement.

17. In a recorder the combination of suitable record-sheet supporting means; a carriage; a turret rotatably mounted on said carriage and provided with a plurality of pencil receiving guides; a plurality of recording pencils mounted in said turret to slide axially therein; an inclined plate guide coacting with said pencils to guide their points one at a time into marking contact with said sheet; means for intermittently rotating said turret to present successive pencils in marking contact with the record sheet; a reversible feed for said carriage; and a trip device actuated by the travel of the carriage near the limit of its motion and connected with the carriage feed and turret rotating means for reversing the feed of the carriage and for causing the partial rotation of the turret.

18. In a recorder the combination of means for supporting a record surface; a carriage provided with means for marking on said surface; a pair of lead screws for simultaneously propelling said carriage; a constant speed propelling device; a reversible drive mechanism between said propelling device and said lead screws; and a control device for reversing said drive mechanism and operable by the travel of the carriage.

19. In a recorder the combination of means for supporting a record surface; a carriage provided with means for marking on said surface; a pair of lead screws for simultaneously propelling said carriage; a constant speed propelling device; a reversible drive mechanism between said propelling device and said lead screws; a tipping track parallel to the path of movement of the carriage; reversing means for said drive mechanism connected with said track and operated by the alternate tipping movements thereof; a weight running on said track and moved along the same by said carriage; and a trip catch device coacting with the track and releasable by the travel of said carriage at the limit of its motion to permit tipping of the track by said weight.

In testimony whereof I have signed my name to this specification.

WENDELL HESS, Jr.